(12) United States Patent
Reif et al.

(10) Patent No.: US 11,156,151 B2
(45) Date of Patent: Oct. 26, 2021

(54) REGULATING DEVICE FOR AN EXHAUST TURBOCHARGER

(71) Applicant: IHI CHARGING SYSTEMS INTERNATIONAL GMBH, Amt Wachsenburg Ot Ichtershausen (DE)

(72) Inventors: Zdenek Reif, Neckargemuend (DE); Manfred Guthoerle, Neckarbischofsheim (DE); Rohit Pawar, Eppelheim (DE); Ralf Schawer, Schwetzingen (DE)

(73) Assignee: IHI CHARGING SYSTEMS INTERNATIONAL GMBH, Amt Wachsenburg Ot Ichtershausen (DE)

( * ) Notice: Subject to any disclaimer, the term of this patent is extended or adjusted under 35 U.S.C. 154(b) by 128 days.

(21) Appl. No.: 16/737,522

(22) Filed: Jan. 8, 2020

(65) Prior Publication Data
US 2020/0141309 A1     May 7, 2020

Related U.S. Application Data

(63) Continuation-in-part of application No. PCT/EP2018/000361, filed on Jul. 18, 2018.

(30) Foreign Application Priority Data

Jul. 21, 2017 (DE) ...................... 10 2017 116 566.5

(51) Int. Cl.
*F02B 37/18* (2006.01)
*F16K 11/078* (2006.01)
(Continued)

(52) U.S. Cl.
CPC .............. *F02B 37/186* (2013.01); *F01N 5/04* (2013.01); *F16K 11/0785* (2013.01); *F16K 11/085* (2013.01)

(58) Field of Classification Search
CPC ........ F02B 37/186; F02B 37/183; F01N 5/04; F16K 11/0785; F16K 11/085; F01D 17/105; F05D 2220/40
(Continued)

(56) References Cited

U.S. PATENT DOCUMENTS

| 8,984,880 B2* | 3/2015 | Marques | ............... F16K 1/2014 60/602 |
| 10,316,664 B2* | 6/2019 | Lummer | ............... F02B 37/183 |

(Continued)

FOREIGN PATENT DOCUMENTS

| DE | 44 39 432 C1 | 11/1995 |
| DE | 10 2010 038 908 A1 | 2/2012 |

(Continued)

OTHER PUBLICATIONS

English translation of International Search Report for the corresponding international application No. PCT/EP2018/000361; dated Sep. 4, 2018; 2 pages.

*Primary Examiner* — J. Todd Newton
(74) *Attorney, Agent, or Firm* — Ronald S. Lombard (57) ABSTRACT

A regulating device for an exhaust turbocharger, is received in an exhaust gas conducting section of the exhaust turbocharger, with the aid of the regulating device a fluid flow onto a turbine wheel rotatably received in the exhaust gas conducting section can be conditioned, a through-flow opening formed in the exhaust gas conducting section is to be opened and closed with the aid of a valve element of the regulating device, the valve element is arranged on a pivot arm of the regulating device, and wherein the valve element has a sealing surface for avoiding a leak in a closed position of the regulating device. To reduce secondary torques acting upon the valve element during operation, a connection is formed between the pivot arm and the valve element in or at (Continued)

least close to a center of gravity of an effective valve element body of the valve element.

21 Claims, 6 Drawing Sheets

(51) Int. Cl.
  *F16K 11/085* (2006.01)
  *F01N 5/04* (2006.01)
(58) Field of Classification Search
  USPC .......................................................... 60/602
  See application file for complete search history.

(56) References Cited

U.S. PATENT DOCUMENTS

| | | | | |
|---|---|---|---|---|
| 10,662,868 | B2* | 5/2020 | Burmester | F01D 17/105 |
| 10,662,869 | B2* | 5/2020 | Walkingshaw | F02B 37/183 |
| 10,746,092 | B2* | 8/2020 | Paulov | F16K 15/03 |
| 10,890,084 | B2* | 1/2021 | Walkingshaw | F02B 37/025 |
| 2011/0173974 | A1* | 7/2011 | Grabowska | F02B 37/183 |
| | | | | 60/602 |
| 2012/0055154 | A1* | 3/2012 | Ebert | F02B 37/186 |
| | | | | 60/602 |
| 2012/0312010 | A1* | 12/2012 | Yasoshima | F01D 17/105 |
| | | | | 60/602 |
| 2015/0125273 | A1* | 5/2015 | Tschirschke | F02B 37/186 |
| | | | | 415/145 |
| 2015/0292395 | A1* | 10/2015 | Dilalan | F16K 1/20 |
| | | | | 60/602 |
| 2016/0032818 | A1* | 2/2016 | Mallett | F16K 1/2042 |
| | | | | 251/318 |
| 2016/0341109 | A1* | 11/2016 | Lummer | F02B 33/40 |
| 2016/0341111 | A1* | 11/2016 | Lummer | F01D 5/021 |
| 2016/0348574 | A1* | 12/2016 | Goeckelmann | F16K 51/00 |
| 2017/0058761 | A1* | 3/2017 | Stilgenbauer | F02B 37/183 |
| 2019/0136752 | A1* | 5/2019 | Burmester | F01D 17/105 |
| 2020/0141309 | A1* | 5/2020 | Reif | F16K 11/085 |
| 2021/0033022 | A1* | 2/2021 | Ebert | F02B 37/025 |

FOREIGN PATENT DOCUMENTS

| | | |
|---|---|---|
| DE | 10 2011 089 777 A1 | 6/2013 |
| DE | 10 2015 011 265 A1 | 3/2016 |
| DE | 10 2016 204 076 A1 | 11/2016 |
| DE | 10 2015 122 351 A1 | 6/2017 |
| DE | 10 2016 103 145 A1 | 8/2017 |

\* cited by examiner

REGULATING DEVICE FOR AN EXHAUST TURBOCHARGER

CROSS-REFERENCE TO RELATED APPLICATIONS

This is a continuation-in-part application of pending international application PCT/EP2018/000361 filed Jul. 18, 2018, and claiming the priority of German application No. 10 2017 116 566.5 filed Jul. 21, 2017. The said International application PCT/EP2018/000361 and German application No. 10 2017 116 566.5 are both incorporated herein by reference in their entireties as though fully set forth.

BACKGROUND OF THE INVENTION

The invention relates to a regulating device for an exhaust turbocharger of the type stated in the preamble of claim 1.

Exhaust gas conducting sections for exhaust turbochargers which have a regulating device for regulating a fluid, in general exhaust gas, which flows through the exhaust gas conducting section are known. The regulating device is provided for opening and closing a bypass duct in the exhaust gas conducting section, through which a fluid can flow, in order to bypass a turbine wheel of the exhaust gas conducting section arranged rotatably in the exhaust gas conducting section in a wheel chamber of the exhaust gas conducting section. It has a cover element for opening and closing a flow cross-section of the bypass duct. With the aid of such a regulating device, it is possible to completely or partially bypass the turbine wheel in specific operating points of the exhaust turbocharger, in particular in operating points which have large flow quantities, thus permitting efficient operation of the exhaust turbocharger.

For instance, DE 10 2015 011 256 A discloses a regulating device for an exhaust gas conducting section, of which the valve element for opening and closing a flow cross-section has a hollow valve body which has an elevation which is formed in its hollow space and is designed to be operatively connected to a pivot arm of the regulating device for positioning the valve element.

In dependence upon a positioning procedure, the regulating device can cause the valve element to become jammed in the flow cross-section because a valve body of the valve element is received on the pivot arm in such a manner as to be movable relative thereto. By reason of the exhaust gas flow impinging upon the valve body in particular during a positioning procedure, so-called secondary torques can occur at the valve element which bring about an undesired secondary movement of the valve body about its center of gravity. This secondary movement which is caused by the secondary torques can result in increased wear and thus also can result in the valve element becoming jammed.

The inflow of exhaust gas into the hollow space of the valve body in various operating points of the exhaust turbocharger is problematic, whereby unfavourable turbulence can occur in the region of the valve body and forces act upon the valve body which can bring about an unexpected movement of the valve element.

Therefore, the object of the present invention is now to provide an exhaust turbocharger regulating device which becomes jammed less frequently and preferably not at all.

SUMMARY OF THE INVENTION

In accordance with the invention, this object is achieved by a regulating device for an exhaust turbocharger comprising the features of claim 1.

An inventive regulating device for an exhaust turbocharger, which is received in an exhaust gas conducting section of the exhaust turbocharger, through which a fluid can flow, and wherein with the aid of the regulating device a fluid flow onto a turbine wheel rotatably received in the exhaust gas conducting section can be conditioned, has a valve element, with the aid of which a through-flow opening formed in the exhaust gas conducting section is to be opened and closed. The valve element is arranged on a pivot arm of the regulating device which can be pivoted about an axis of rotation. It has a valve body which comprises an insert element which is received predominantly in the valve body and which is operatively connected to the pivot arm in particular with the aid of a lever arm. Furthermore, the valve element has a sealing surface in order to avoid a leak in a closed position of the regulating device. In accordance with the invention, in order in particular to reduce secondary torques acting upon the valve element during operation, a connection is formed between the pivot arm and the valve element in or at least as close as possible to a center of gravity of an effective valve element body of the valve element.

The effective valve element body corresponds to the part of the valve element which is operatively connected to the pivot arm. Although the insert element is encompassed by the valve body, it is to be functionally allocated to the pivot arm which is connected at least indirectly to the valve element.

The advantage of the invention can be seen in the fact that, since the connection is formed between the pivot arm and the valve element in or at least as close as possible to the center of gravity of the effective valve element body, a lever formed between an engagement point of a flow force of the exhaust gas flow and the center of gravity is small and therefore the correspondingly generated secondary torque can likewise be kept small. Ideally, no lever is formed and so no secondary torque is generated. As a result, any jamming of the valve element by reason of the secondary torques is substantially reduced and possible even eliminated.

At this juncture, the term secondary moment will be explained. A distinction is to be made in this case between the torque on the valve body, which is formed by reason of the movement caused by a pivoting movement or a rotation about an axis of rotation of the pivot arm and which is brought about in a directed manner by reason of the valve element being received on a lever arm which is connected to the pivot arm, and the torques explained above acting upon the valve body by reason of a force of the exhaust gas flow.

In one embodiment of the invention, in order to establish a connection to the pivot arm, said connection being formed as close as possible to the center of gravity of the effective valve element body, at least a first guide contact and/or a second guide contact is formed between the lever arm and the effective valve element body. As a result, jamming of the valve element in the through-flow opening during opening and/or closing of the through-flow opening can be avoided. In other words, this means that, since the effective valve element body can be moved relative to the pivot arm, said pivot arm can be influenced by forces of the exhaust gas flow, whereby the secondary torques explained above occur and urge the valve element in a corresponding direction, which can result in increased wear and thus also in jamming.

In a further embodiment of the invention, the first guide contact is at a first spaced interval from the sealing surface, said spaced interval being formed along a longitudinal axis of the valve element in the direction of an element surface of the valve body remote from the lever arm, or in the direction of the lever arm, wherein the first spaced interval has a value which is at least greater than 0. This avoids any jamming during an opening procedure of the regulating device, therefore starting from a closed position to an open position of the regulating device. Furthermore, wear is reduced because the first guide contact is located close to an engagement surface of the exhaust gas flow on the valve element, the sealing surface.

In a further embodiment of the invention, the second guide contact is at a second spaced interval from the sealing surface, said spaced interval being formed along a longitudinal axis of the valve element in the direction of an insert element surface of the insert element remote from the lever arm, wherein the second spaced interval has a value which is at least greater than a first spaced interval of the first guide contact and less than a third spaced interval of the sealing surface from the direction of an element surface of the valve body remote from the lever arm. This avoids any jamming during a closing procedure of the regulating device, therefore starting from an open position to a closed position of the regulating device.

In a further embodiment of the regulating device in accordance with the invention, the sealing surface is formed on an outer surface of the valve element, and wherein the first guide contact and/or the second guide contact are formed in a hollow space of the valve element. Therefore, it is possible to produce a regulating device with reduced installation space because the necessary guide contact does not have to be arranged on an outer surface of the valve element. In particular, the valve element can advantageously also be provided for a multiple-flow exhaust gas conducting section because its cross-sectional surface can be designed similar to an elliptical or oval cross-section. Of course, a round cross-section is also possible.

In order to avoid an inflow of a fluid, in other words exhaust gas, into the valve body a cover element is designed to at least substantially close the hollow space of the valve body.

In a further embodiment of the regulating device in accordance with the invention, the insert element is supported on the cover element, thus ensuring radial guidance of said cover element in relation to a longitudinal axis of the valve element.

In a further embodiment of the regulating device in accordance with the invention, the insert element is securely supported on a valve tray formed in the hollow space.

In order to produce the regulating device in a cost-effective manner, the insert element is independent of the valve body. As a result, the insert element can be produced in a simple manner, e.g. if it is rotationally symmetrical, or the portions of the insert element which are rotationally symmetrical are produced by so-called rotational machining. Also, irrespective of the materials, undercuts which make it complex and therefore expensive to design a tool are not formed in the different casting or deep-drawing or die-casting methods.

In a further embodiment of the regulating device in accordance with the invention, the insert element has a latching element. This prevents rotation of the effective valve element body relative to a valve seat which is designed comprising the through-flow opening. A rotation-preventing means is required so as to prevent any jamming in the exhaust gas conducting section because a valve seat surface, which is formed in the direction of the longitudinal axis of the valve element, in the exhaust gas conducting section is at a certain spaced interval from a contour of the valve element formed along the longitudinal axis, when the regulating device is in the closed position.

Furthermore, the advantage is that the latching element is arranged in the hollow space of the valve body because the insert element is likewise positioned at least partially in the hollow space, whereby an installation space requirement is reduced in comparison with a latching element arranged on an outer surface of the valve body. Likewise, a mass and thus a weight of the valve element can be reduced at least indirectly by reason of the space to be kept available in the effective valve element body.

In a further embodiment of the regulating device in accordance with the invention, the cover element is supported on the valve body. As a result, when establishing the, in particular, first guide contact during the opening movement of the regulating device, the insert element can be securely supported on the cover element.

In a further embodiment of the regulating device in accordance with the invention, the valve body has locking elements which extend in the direction of the hollow space and lie opposite locking elements formed on the cover element. These locking elements are to be machined preferably in an accurately fitting manner so as to be able to achieve a cost-effective assembly of the cover element with the valve body. Therefore, e.g. in order to maintain the function of the valve element it is of lesser importance whether walls which are formed between the locking elements are produced in an accurately fitting manner. In other words, this means that in the production process only the locking elements are to be machined in an accurately fitting manner, whereby the production process is shortened and therefore lower production costs are incurred.

If the locking elements or at least one locking element are/is formed in a complementary manner to receiving openings of the cover element and/or of the valve body, a relative arrangement of the locking element and of the valve body with respect to one another can be secured.

In a further embodiment of the regulating device in accordance with the invention, the lever arm has an opening, with the aid of which the insert element is connected to the lever arm. In other words, this means that the lever arm and the insert element can be produced independently of one another even though, during operation of the regulating device, they serve to position the valve element and accordingly can also be formed in one piece. Independent production has the advantage that e.g. the lever arm can have a complex geometry which, however, can be easily manufactured without the insert element because undercuts do not have to be formed. The further advantage e.g. in comparison with a fork-shaped receiving opening in the lever arm is the ability to form a press-fit which ensures that the insert element is fixed to the lever arm. Furthermore, by omitting a disk of a conventional connection of the valve element to the lever arm, said disk being designed typically as a securing element, a height of the valve element can be reduced.

In a further embodiment of the regulating device in accordance with the invention, a pretensioning element is formed between the insert element and the cover element. Therefore, improved damping can be achieved when the insert element strikes against the cover element during an opening procedure of the regulating device in order to reduce wear and noise development. Furthermore, the secondary torques can be reduced.

In a further embodiment of the regulating device in accordance with the invention, a pretensioning element is arranged between the valve tray and the insert element.

Therefore, improved damping can be achieved when the insert element strikes against the valve tray during a closing procedure of the regulating device in order to reduce wear and noise development.

In a further embodiment of the regulating device in accordance with the invention, a receiving element of the insert element is cylindrical. Therefore, an opening formed in the lever arm for receiving the insert element which serves to connect the valve element to the lever arm can be produced easily and cost-effectively with the aid of a bore. A further substantial advantage of the cylindrical shape of the receiving element is that an angle orientation of the effective valve element body relative to an axis of rotation of the pivot arm can be adjusted by means of simple rotation. This means e.g. that the regulating device in accordance with the invention can be adapted in a problem-free manner to different exhaust gas conducting sections and the through-flow openings formed therein, and so the regulating device can be produced in large numbers cost-effectively because it can be used in differently designed exhaust gas conducting sections.

In a further embodiment of the regulating device in accordance with the invention, the valve body has a substantially elliptical or oval cross-section. In particular, an overflow opening of a multiple-flow exhaust gas conducting section can thus be advantageously closed. In comparison with a typically round cross-section, an elliptical or oval cross-section is more cost-effective by reason of the lower material consumption.

In a further embodiment of the regulating device in accordance with the invention, the insert element has a cross-section which is substantially identical in shape to a cross-section of the hollow space for the purpose of simplified assembly.

In a further embodiment of the regulating device in accordance with the invention, a damping element and/or cooling element is formed in at least one space formed between the insert element and the valve body. Therefore, the space can be easily filled in a beneficial manner. This can influence the wear, noise development and temperature behaviour of the valve element. For example, a cooling element serves to cool the valve element arranged in the hot exhaust gas stream, and so jamming by reason of thermally induced warpage of the valve element can also be prevented. Or, a damping element can be accommodated independently of the aforementioned pretensioning elements, whereby the secondary torques of the forces acting upon the valve element by reason of the exhaust gas flow can be further reduced.

BRIEF DESCRIPTION OF THE DRAWINGS

Advantages, features and details of the invention will be apparent from the following description of preferred exemplified embodiments and with reference to the drawings. The features and combinations of features mentioned earlier in the description and the features and combinations of features mentioned hereinunder in the description of the figures and/or illustrated individually in the figures can be employed not only in the combination stated in each case but also in other combinations or on their own without departing from the scope of the invention. Like or functionally identical elements are allocated identical reference signs. In the figures.

DETAILED DESCRIPTION OF THE INVENTION

Figure 1:
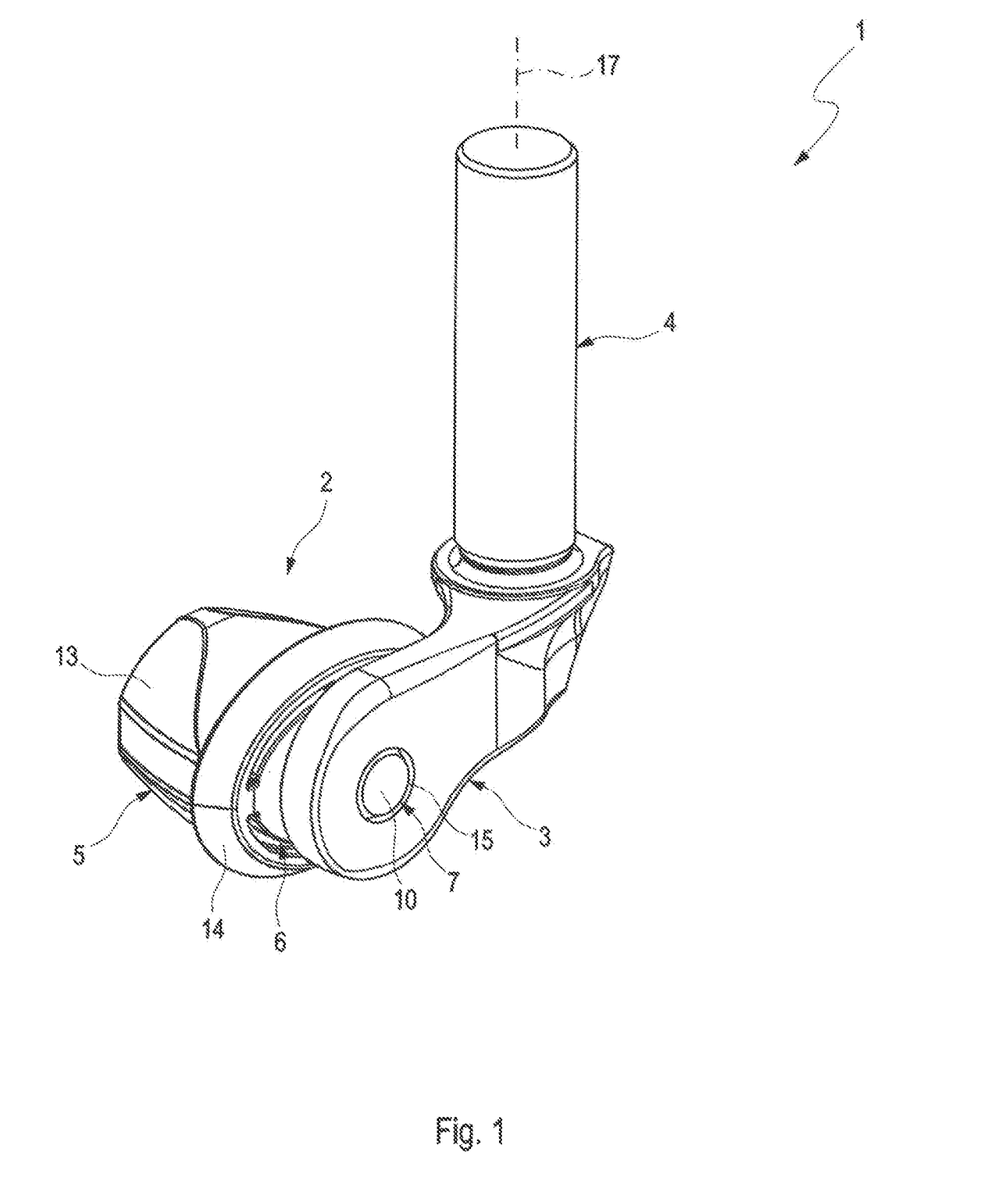
FIG. 1 shows a perspective sectional view of a regulating device in accordance with the invention.

A regulating device 1, designed as shown in FIG. 1, for an exhaust gas conducting section, which is not illustrated in greater detail and through which a fluid can flow, of an exhaust turbocharger, not illustrated in greater detail, comprises a valve element 2 which is provided for opening or closing a through-flow opening formed in the exhaust gas conducting section. Furthermore, the regulating device 1 comprises a pivot arm 4 which can be rotated about its axis of rotation 17 and has a lever arm 3 which is connected to the valve element 2 at its end remote from the pivot arm 4.

The exhaust gas conducting section, not illustrated in greater detail, comprises an inlet channel to allow a fluid flow into the exhaust gas conducting section, in general exhaust gas of an internal combustion engine, and a spiral channel downstream of the inlet channel to condition the flow and an outlet channel, not illustrated in greater detail, downstream of the spiral channel, via which the exhaust gas can escape from the exhaust gas conducting section in a directed manner. Formed between the spiral channel and the outlet channel is a wheel chamber, not illustrated in greater detail, in which a turbine wheel, not illustrated in greater detail, is rotatably received.

The exhaust gas conducting section is connected to an exhaust gas manifold of the internal combustion engine in such a manner as to allow the flow of a fluid therethrough, so that the exhaust gas of the internal combustion engine can enter into the spiral channel via the inlet channel in order to act upon the turbine wheel. The exhaust gas conducting section can be designed as a multiple-flow housing so that e.g. a further spiral channel is formed. The through-flow opening can thus also be formed in a so-called flow partition wall which fluidically separates the spiral channels from one another.

In order to adapt an operating behaviour of the exhaust turbocharger to the fluid flow of the internal combustion engine, the regulating device 1 is arranged in the exhaust gas conducting section and serves to close or open a bypass duct with the through-flow opening. Likewise, the regulating device 1 can also be designed for an overflow of exhaust gas from one spiral channel and the others and vice versa. Furthermore, the regulating device 1 can also be designed for the overflow of exhaust gas and for the discharge of exhaust gas, in other words to bypass the turbine wheel. Such an exhaust gas conducting section is known e.g. from DE 10 2016 103 145 A1.

In a first position, the closed position of the regulating device 1 which corresponds to a closed position of the valve element 2, the through-flow opening is completely closed. This means that in the event the through-flow opening is an overflow opening designed for fluidically connecting the spiral channels, the two spiral channels can have a fluid flowing therethrough completely separately from one another, wherein the through-flow opening is completely closed with the aid of the valve element 2. The exhaust gas of the internal combustion engine flows through the two spiral channels, wherein a first part of the exhaust gas flows through the first spiral channel and a second part of the exhaust gas flows through the second spiral channel.

If the through-flow opening is an opening of a bypass duct, it is also the case here, in the first position of the regulating device 1, that the valve element 2 is arranged in such a manner as to completely close the through-flow opening.

If the through-flow opening is designed in the form of a combination of the overflow opening and the opening of the bypass duct, then in the first position, the closed position of the valve element 2, the spiral channels can have a fluid flowing therethrough separately from one another such that no overflow occurs, and also the bypass duct is closed such that exhaust gas is not directed past the turbine wheel.

In a second position of the regulating device 1 which corresponds to a second position of the valve element 2, the through-flow opening is completely open. This means that exhaust gas can overflow from the first spiral channel into the second spiral channel and vice versa, and/or exhaust gas can be guided past the turbine wheel via the opening of the bypass duct.

The valve element 2 is to be positioned between the first position and the second position into further intermediate positions, and so the through-opening can be adapted to a corresponding requirement to achieve the best possible efficiency of the exhaust turbocharger according to the through-flowing exhaust gas quantity.

The valve element 2 of the regulating device 1 is constructed of multiple parts and has a valve body 5, a cover element 6 for closing the valve body 5 and an insert element 7 connecting the valve body 5 to the lever arm 3. The insert element 7 is illustrated in greater detail in FIG. 7 and comprises a body portion 8 which lies opposite a valve tray 9 of the valve body 5. The insert element 7 is to be functionally allocated to the lever arm 3 because the connection of a so-called effective valve element body 31, comprising at least the valve body 5 and the cover element 6, is established with the aid of the insert element 7.

Figure 7:
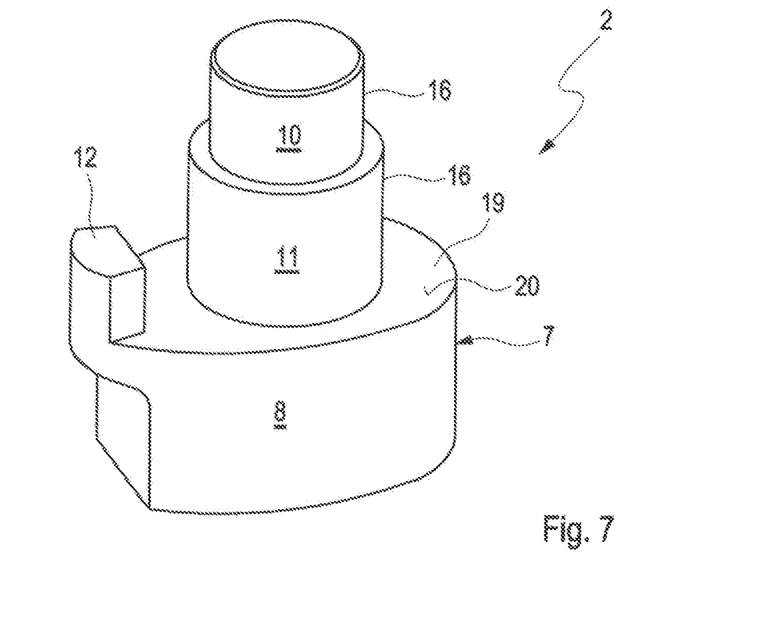
FIG. 7 shows a perspective view of an insert element of a valve element of the regulating device of FIG. 1.
Figure 8:
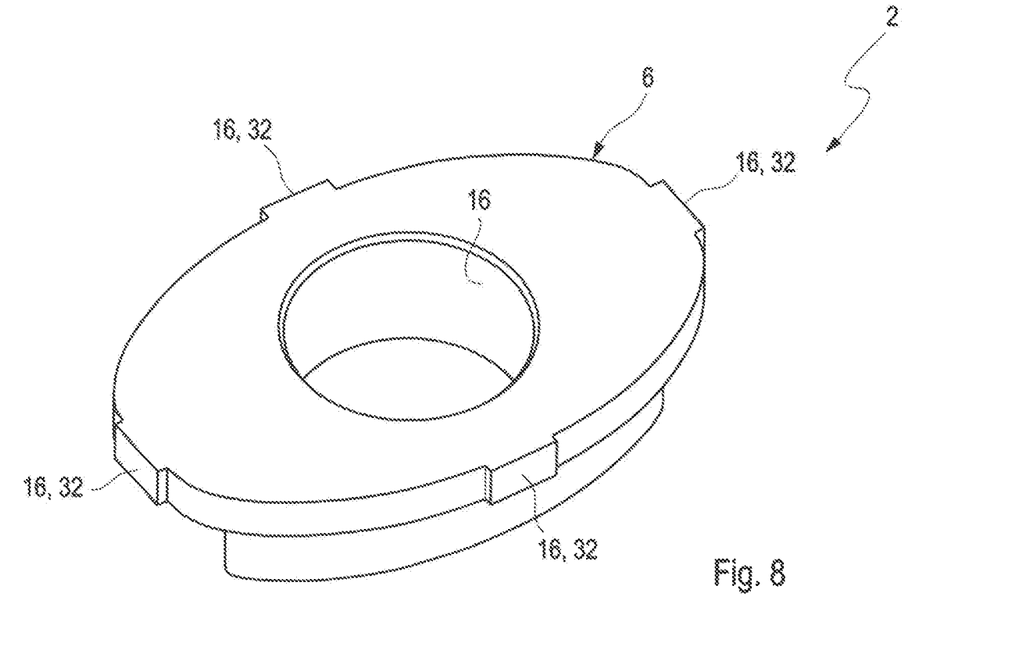
FIG. 8 shows a perspective plan view of a cover element of the valve element of the regulating device of FIG. 1.
Figure 9:
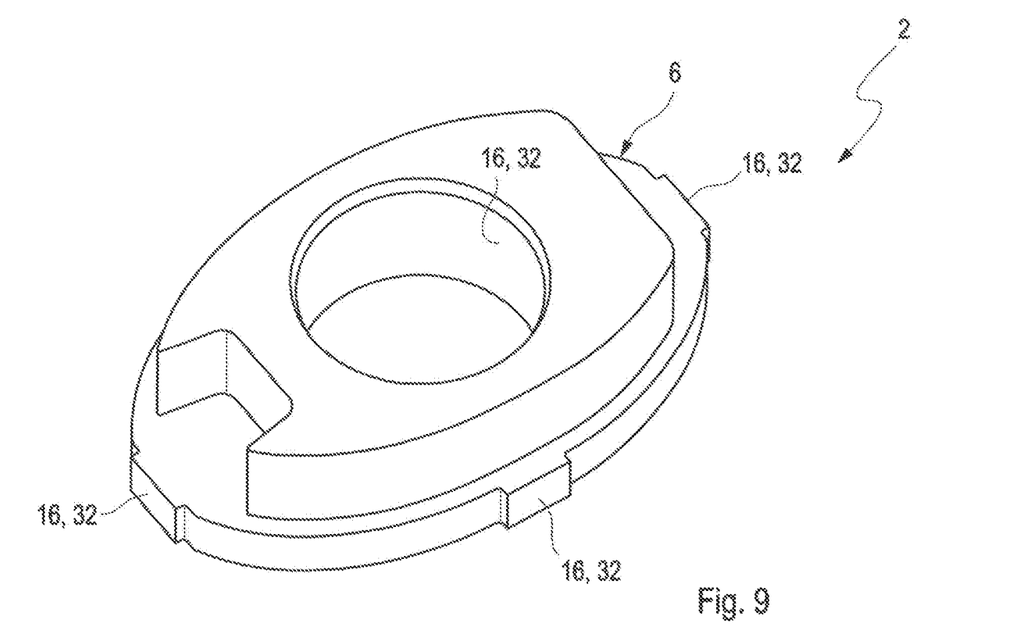
FIG. 9 shows a perspective bottom view of the cover element of FIG. 8.
Figure 10:
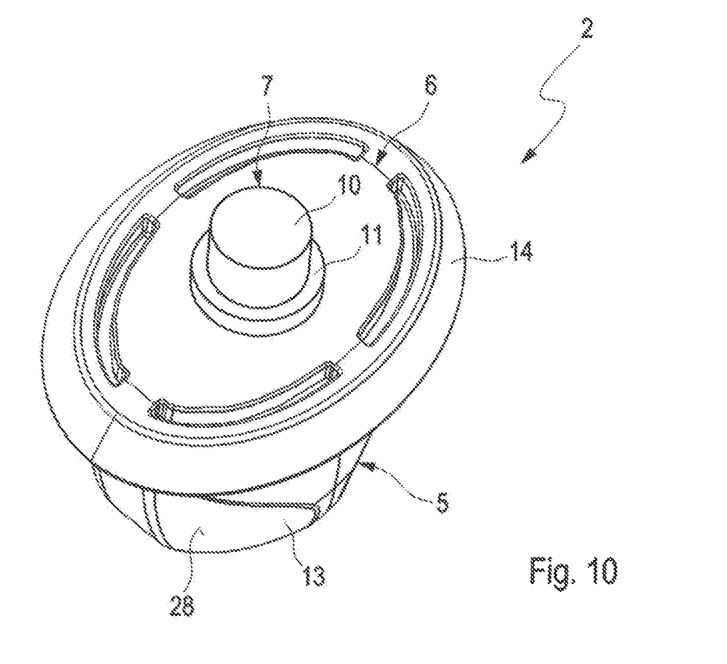
FIG. 10 shows a perspective plan view of the valve element of the regulating device of FIG. 1.
Figure 11:
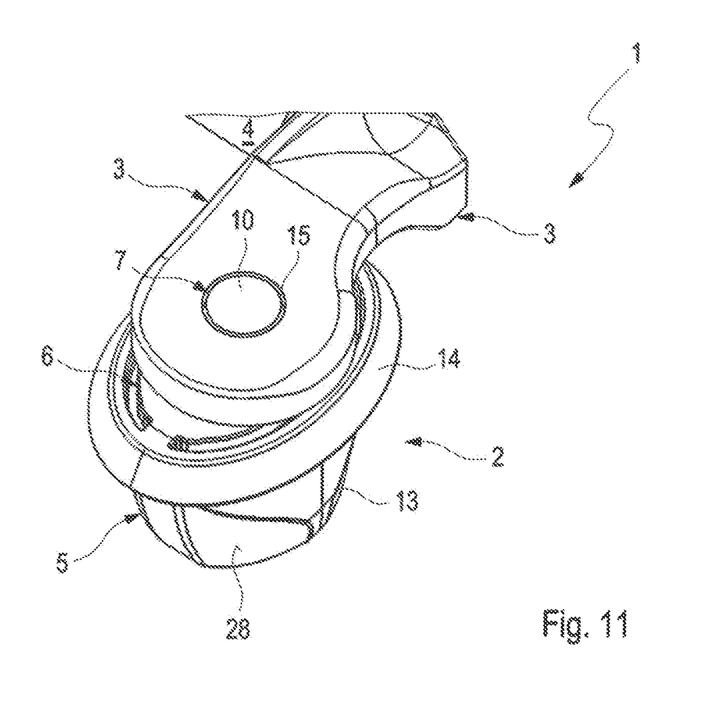
FIG. 11 shows a perspective plan view of the regulating device of FIG. 1.

Furthermore, the insert element 7 comprises, between a receiving portion 10 serving to receive and fasten the valve element 2 with the lever arm 3, a holding portion 11 which is provided for supporting the cover element 6.

Figure 4:
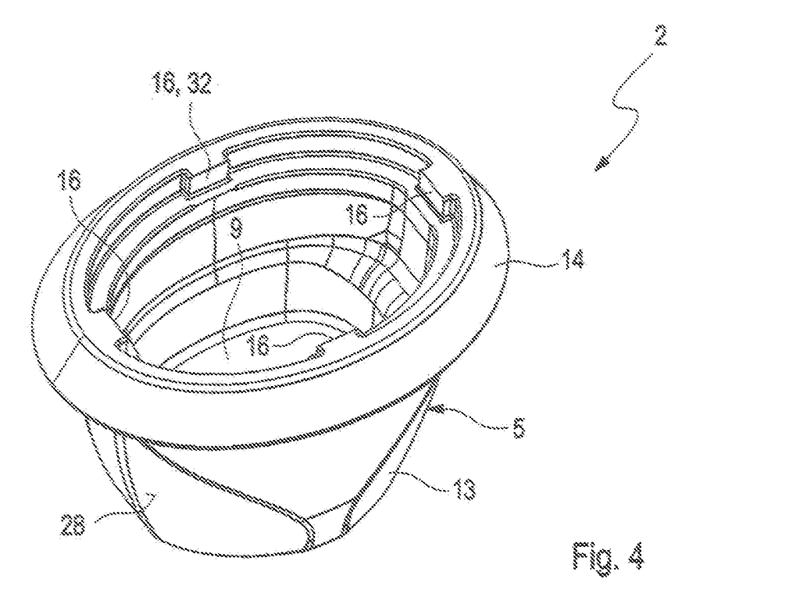
FIG. 4 shows a perspective plan view of a valve body of the regulating device of FIG. 1.
Figure 5:
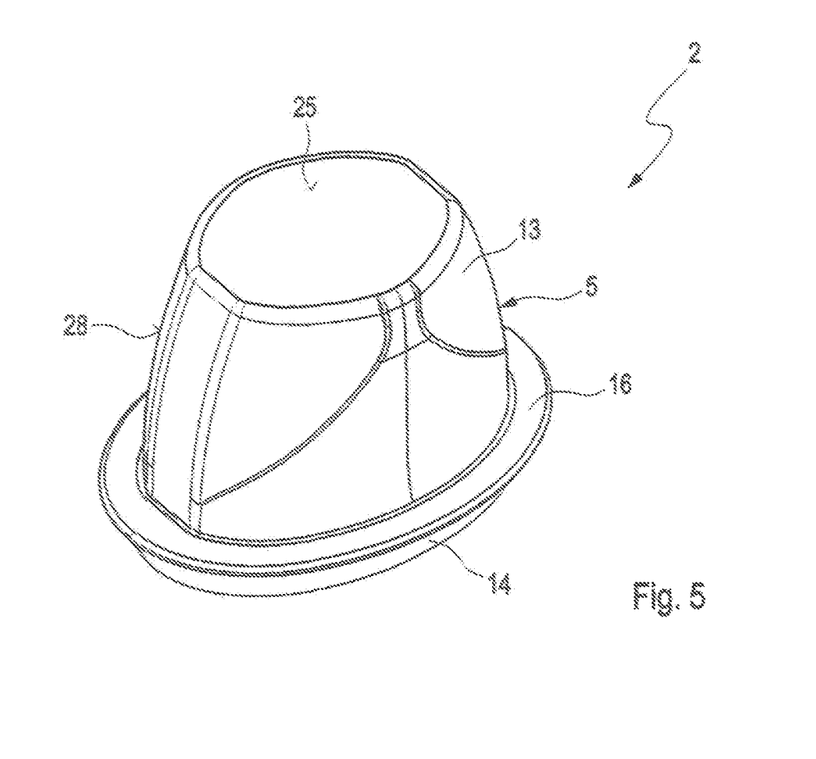
FIG. 5 shows a perspective bottom view of the valve body of FIG. 4.
Figure 6:
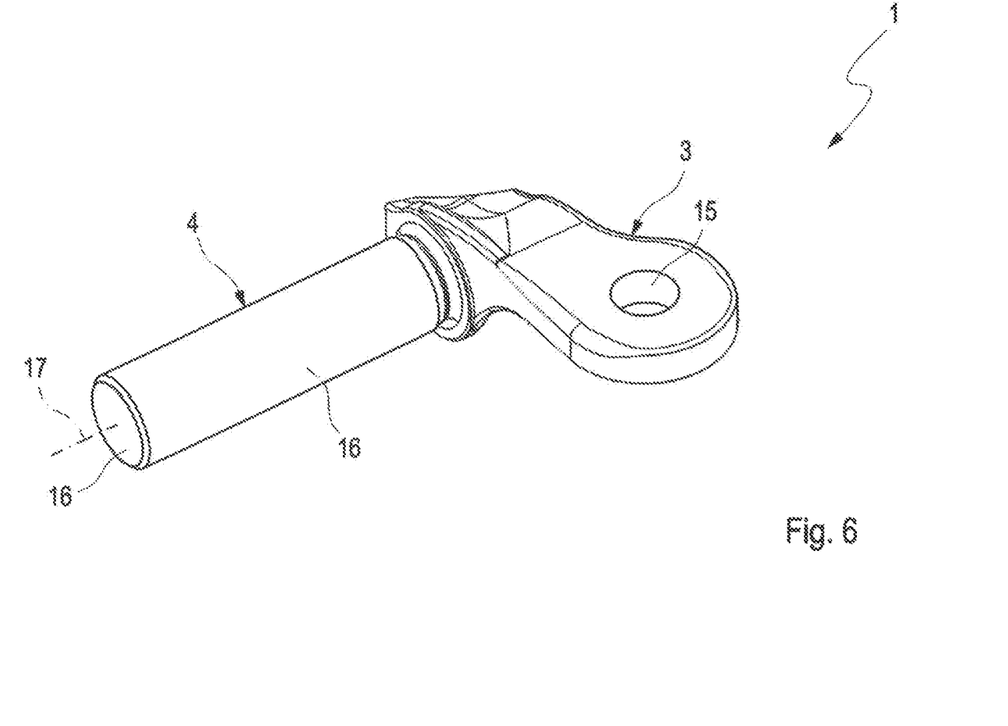
FIG. 6 shows a perspective view of a lever arm with a pivot arm of the regulating device.

The valve body 5 is formed in the manner of a pot for receiving the insert element 7, in particular for completely receiving its body portion 8. Therefore, the valve body 5 has a hollow space 29 which is designed to receive at least the body portion 8. Preferably, a latching element 12 is attached to the body portion 8.

In order to securely seal the through-flow opening in a closed state, therefore in the first position of the regulating device 1, the valve body 5 has, at its end facing the lever arm 3, a collar 14 which protrudes over the pot-shaped portion 13 of the valve body 5.

In contrast to the known regulating devices, the regulating device 1 in accordance with the invention has the valve element 2 comprising the valve body 5 and in particular the insert element 7 which is supported on the valve tray 9 and, in the direction of the lever arm 3, is supported thereon at its end remote from the valve tray 9. The insert element 7 is fixedly connected to the lever arm 3, wherein its receiving portion 10 is immovably received in an opening 15 of the lever arm 3. The latching element 12 serves to securely position the valve body 5 relative to the lever arm 3 which is connected to the insert element 7. In other words, it is provided as a rotation-preventing means.

With the aid of the insert element 7, a connection of the valve element 2 to the lever arm 3 is established which corresponds to a connection of the valve element 2 to the lever arm 3 in or close to a center of gravity of the valve element 2. In other words, this means that with the aid of the insert element 7 an extension of the lever arm 3 is formed which is connected to the effective valve element body 31 in or at least close to a center of gravity thereof. As a result, wear of the regulating device 1 can be substantially reduced.

A further advantage is the valve body 5 being guided through the body portion 8 supported on the valve tray 9. This means that, when the through-opening is being closed, the valve element 2 is pulled into said opening through the body portion 8. When the through-opening is being opened, the valve element 2 is guided on the lever arm 3 and is pulled out of the through-opening. As a result, the jamming susceptibility is substantially reduced.

When producing the regulating device 1 in accordance with the invention, the lever arm 3 is preferably welded to the receiving portion 10 in the same way as the valve body 5 is welded to the cover element 6.

In order to produce a preferred fit and to reduce excessive clearance, specific points 16 on the valve body 5, the pivot arm 4, the insert element 7, the cover element 6 are additionally machined, e.g. by cutting. In other words, this means that during production of the regulating device 1 in the casting method the remaining regions do not have to be additionally machined. The points 16 on the cover element 6 and the valve body 5 are formed on locking elements 32 which serve to arrange the cover element 6 relative to the valve body 5.

Figure 2:
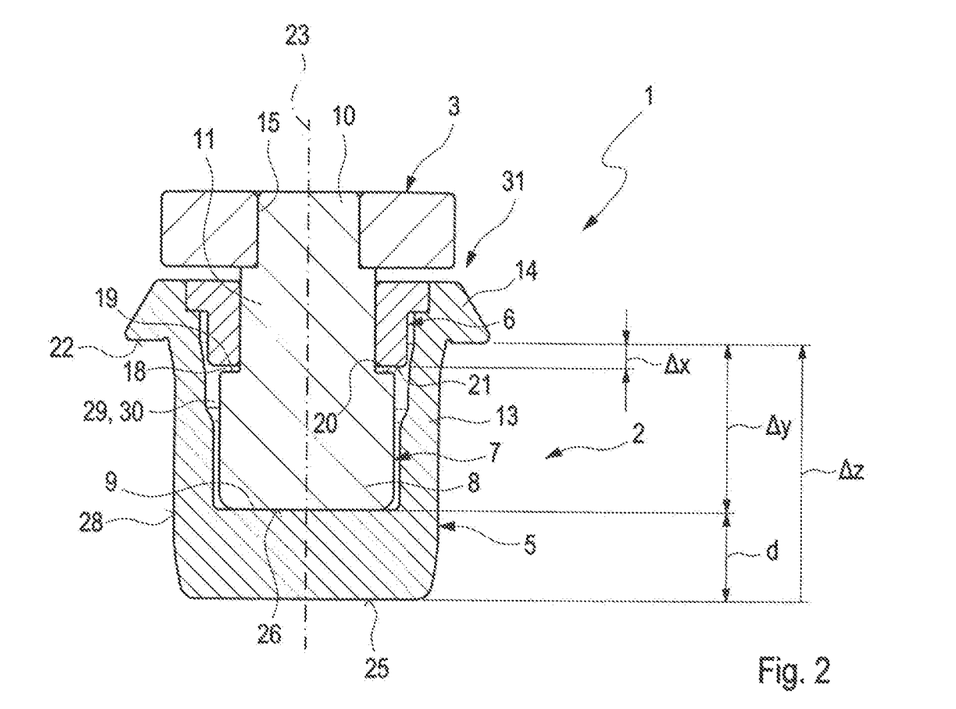
FIG. 2 shows a sectional view of the regulating device of FIG. 1.
Figure 3:
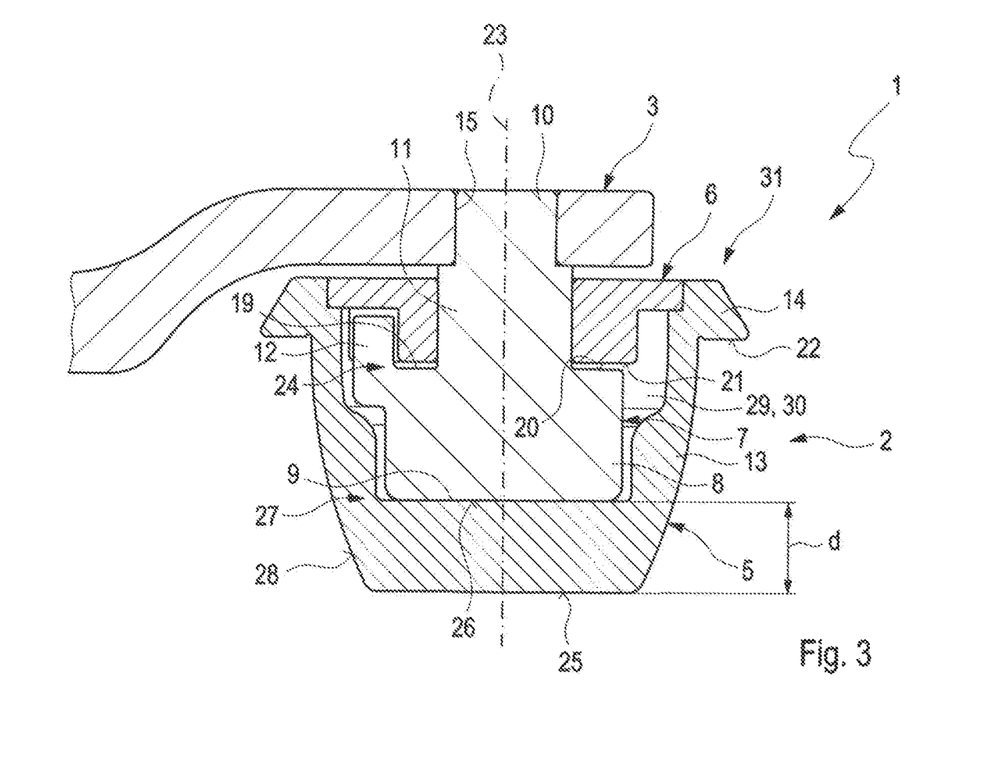
FIG. 3 shows a further sectional view of the regulating device of FIG. 1.

A gap 18 is formed between the cover element 6 and the insert element 7 and between the insert element 7 and the valve tray 9 in dependence upon a position of the valve element 2. In FIGS. 2 and 3, the gap 18 is formed between the insert element 7 and the cover element 6. The arrangement of the elements 6, 7 corresponds to its arrangement in the first position, therefore in the closed position of the valve element 2 during operation of the exhaust turbocharger.

A first shoulder 19 is formed on the insert element 7 between the insert element 7 and the cover element 6 in order to effectively support the two elements 6, 7 with respect to one another, said shoulder having a first guide surface 20 which lies opposite a second guide surface 21 which is formed on the cover element 6, lying opposite the first guide surface 20. As soon as the first guide surface 20 and the second guide surface 21 contact one another, a first guide contact 24 of the valve element 2 is formed. The first guide contact 24 is then arranged relative to a sealing surface 22 which is formed on the collar 14 remotely from the lever arm 3, at an axial first spaced interval $\Delta x$ present along a longitudinal axis 23 of the valve element 2 and in the direction of an element surface 25 of the valve body 5 remote from the lever arm 3.

The sealing surface 22 is formed on a side of the collar 14 which is remote from the lever arm 3 and extends radially outwards starting from the longitudinal axis 23. In other words, this means that it is formed on an outer surface 28 of the valve element 2.

In the second position and in particular starting from the first position to the second position, therefore during an opening procedure of the through-flow opening, the gap 18 is formed between the valve tray 9 and an insert element surface 26 lying opposite the valve tray 9. When the valve tray 9 and the insert element surface 26 contact one another, a second guide contact 27 of the valve element 2 is formed. Therefore, the first guide contact 24 is formed in particular during the opening procedure and in the second position and the second guide contact 27 is formed in particular during the closing procedure, therefore starting from an open position to the closed position, and in the first position of the regulating device 1. The second guide contact 27 is then arranged relative to a sealing surface 22 which is formed on the collar 14 remotely from the lever arm 3, at an axial second spaced interval Δy present along a longitudinal axis 23 of the valve element 2 and in the direction of an element surface 25 of the valve body 5 remote from the lever arm 3.

Of course, the gap 18 can be formed in specific positions of the regulating device 1 both between the cover element 6 and the insert element 7 and between the insert element 7 and the valve tray 9. Its height, as viewed along the longitudinal axis 23, is then different in each case from the height formed in the first position and in the second position.

The two guide contacts 24, 27 are to be arranged at preferred specific spaced intervals Δx, Δy relative to the sealing surface 22 in order to avoid jamming during opening or closing of the through-flow opening. Preferably, the first guide contact 24 is to be arranged at a smallest possible first spaced interval Δx, therefore close to the sealing surface 22 and in the direction of the element surface 25, particularly preferably in the direction of the lever arm 3. The second guide contact 27 should be at a largest possible second spaced interval Δy with respect to the sealing surface 22 in the direction of the element surface 25. Therefore, the second guide surface 21 which is arranged immovably in the hollow space 29 is to be positioned at the preferred first spaced interval. The valve tray 9 which, in the present exemplified embodiment, constitutes an immovable surface of the second guide contact 27 is to be provided at a smallest possible spaced interval with respect to the element surface 25 so that the second spaced interval can be configured relatively large. This is also conducive to a low weight of the valve element 2 because at least one element thickness d of the valve body 5 is configured small in the region of the valve tray 9.

In one exemplified embodiment, not illustrated in greater detail, pretensioning elements are provided, e.g. in the form of plate springs or spiral springs, between the valve tray 9 and the insert element surface 26 and between the first guide surface 20 and the second guide surface 21 and between the cover element 6 and the lever arm 3. Likewise, the spring element could also be arranged at only one of said positions or at two of these positions. If e.g. spiral springs are designed, preferably multiple-layer spiral springs are to be provided because an axial gap is very small in the positions. The advantage of a spiral spring can be seen in its sliding properties, which are better than a typical plate spring, by reason of its round spring cross-section.

In a further exemplified embodiment, not illustrated in greater detail, of the regulating device 1 in accordance with the invention, a space 30 of the valve body 5 is filled with a functional substance. The space 30 corresponds to the space of the hollow space 29 which has remained between the insert element 7 and the valve body 5 and the cover element 6. The functional substance can be e.g. a substance for cooling the valve element 2. Likewise, it can be configured e.g. in the form of a gel-like substance for damping relative movements between the lever arm 3 and the valve body 5. In other words, this means that the hollow space 29 can be filled in any way which acts to improve function, i.e. permits a particularly jamming-free movement of the valve element 2, and acts to reduce wear and/or noise.

What is claimed is:

1. A regulating device for an exhaust turbocharger, wherein the regulating device (1) is received in an exhaust gas conducting section of the exhaust turbocharger, through which a fluid can flow, and wherein with the aid of the regulating device (1) a fluid flow onto a turbine wheel rotatably received in the exhaust gas conducting section can be conditioned, wherein a through-flow opening formed in the exhaust gas conducting section is to be opened and closed with the aid of a valve element (2) of the regulating device (1), and wherein the valve element (2) is arranged on a pivot arm (4) of the regulating device (1) which can be pivoted about an axis of rotation (17), and wherein the valve element (2) has a valve body (5) which comprises an insert element (7) which is received predominantly in a hollow space (29) of the valve body (5) and which is operatively connected to the pivot arm (4) in particular with the aid of a lever arm (3), and wherein the valve element (2) has a sealing surface (22) for avoiding a leak in a closed position of the regulating device (1),
   characterized in that, in order in particular to reduce secondary torques acting upon the valve element (2) during operation, a connection is formed between the pivot arm (4) and the valve element (2) in or at least close to a center of gravity of an effective valve element body (31) of the valve element (2), wherein the effective valve element body (31) comprises the valve body (5) and a cover element (6) which, in order to avoid an inflow of a fluid into the valve body (5), is configured to close the hollow space (29) of the valve body (5), wherein the cover element (6) is configured to cover the insert element (7) at least partially.

2. The regulating device as claimed in claim 1, characterized in that, in order to avoid jamming of the valve element (2) during opening and/or closing, a first guide contact (24) or a second guide contact (27) is formed between the pivot arm (4), in particular between a lever arm (3) and the effective valve element body (31).

3. The regulating device as claimed in claim 2, characterized in that the first guide contact (24) is at a first spaced interval (Δx) from the sealing surface (22), said first spaced interval (Δx) being formed along a longitudinal axis (23) of the valve element (2) in the direction of an element surface (25) of the effective valve element body (31) remote from the lever arm (3), or in the direction of the lever arm (3).

4. The regulating device as claimed in claim 2, characterized in that the second guide contact (27) is at a second spaced interval (Δy) from the sealing surface (22), said second spaced interval (Δy) being formed along a longitudinal axis (23) of the valve element (2) in the direction of an insert element surface (26) of the insert element (7) remote from the lever arm (3).

5. The regulating device as claimed in claim 2, characterized in that the sealing surface (22) is formed on an outer surface (28) of the valve element (2), and wherein the first guide contact (24) and/or the second guide contact (27) are formed in the hollow space (29) of the valve body (5).

6. The regulating device as claimed in claim 1, characterized in that the cover element (6) is supported on the insert element (7).

7. The regulating device as claimed in claim 1, characterized in that the insert element (7) is supported on a valve tray (9) formed in the hollow space (29).

8. The regulating device as claimed in claim 1, characterized in that the insert element (7) is independent of the valve body (5).

9. The regulating device as claimed in claim 1, characterized in that the insert element (7) has a latching element (12).

10. The regulating device as claimed in claim 1, characterized in that the cover element (6) is supported on the valve body (5).

11. The regulating device as claimed in claim 1, characterized in that the valve body (5) and/or the cover element (6) have locking elements (32) which extend radially in the direction of the hollow space (29) and are formed in a complementary manner to receiving openings of the cover element (6) and/or of the valve body (5).

12. The regulating device as claimed in claim 1, characterized in that the valve body (5) has locking elements (32) which extend in the direction of the hollow space (29) and lie opposite locking elements (32) formed on the cover element (6).

13. The regulating device as claimed in claim 1, characterized in that the lever arm (3) has an opening (15), with the aid of which the insert element (7) is connected to the lever arm (3).

14. The regulating device as claimed in claim 1, characterized in that a pretensioning element is formed between the insert element (7) and the cover element (6).

15. The regulating device as claimed in claim 1, characterized in that a pretensioning element is arranged between the valve tray (9) and the insert element (7).

16. The regulating device as claimed in claim 1, characterized in that a receiving portion (10) of the insert element (7) is cylindrical.

17. The regulating device as claimed in claim 1, characterized in that the valve body (5) has a substantially elliptical cross-section.

18. The regulating device as claimed in claim 1, characterized in that the insert element (7) has a cross-section which is substantially identical in shape to a cross-section of the hollow space (29).

19. The regulating device as claimed in claim 1, characterized in that a damping element and/or cooling element is formed in at least one space (30) formed between the insert element (7) and the valve body (5).

20. The regulating device as claimed in claim 3, characterized in that the first spaced interval ($\Delta x$) has a value which is at least greater than 0.

21. The regulating device as claimed in claim 4, characterized in that the second spaced interval ($\Delta y$) has a value which is at least greater than a first spaced interval ($\Delta x$) of the first guide contact (24) and less than a third spaced interval ($\Delta z$) of the sealing surface (22) from the direction of an element surface (25) of the valve body (5) remote from the lever arm (3).

* * * * *